3,182,105
PROCESS OF RENDERING POLYOLEFINS MORE DYE RECEPTIVE BY MIXING WITH ORGANIC COMPOUNDS HAVING PHENOLIC HYDROXY GROUPS
Alberto Bonvicini and Cornelio Caldo, Terni, Italy, assignors to Montecatini Società Generale per l'Industria Mineraria e Chimica, Milan, Italy
Filed May 16, 1960, Ser. No. 29,139
Claims priority, application Italy, May 18, 1959, 8,372/59
11 Claims. (Cl. 264—78)

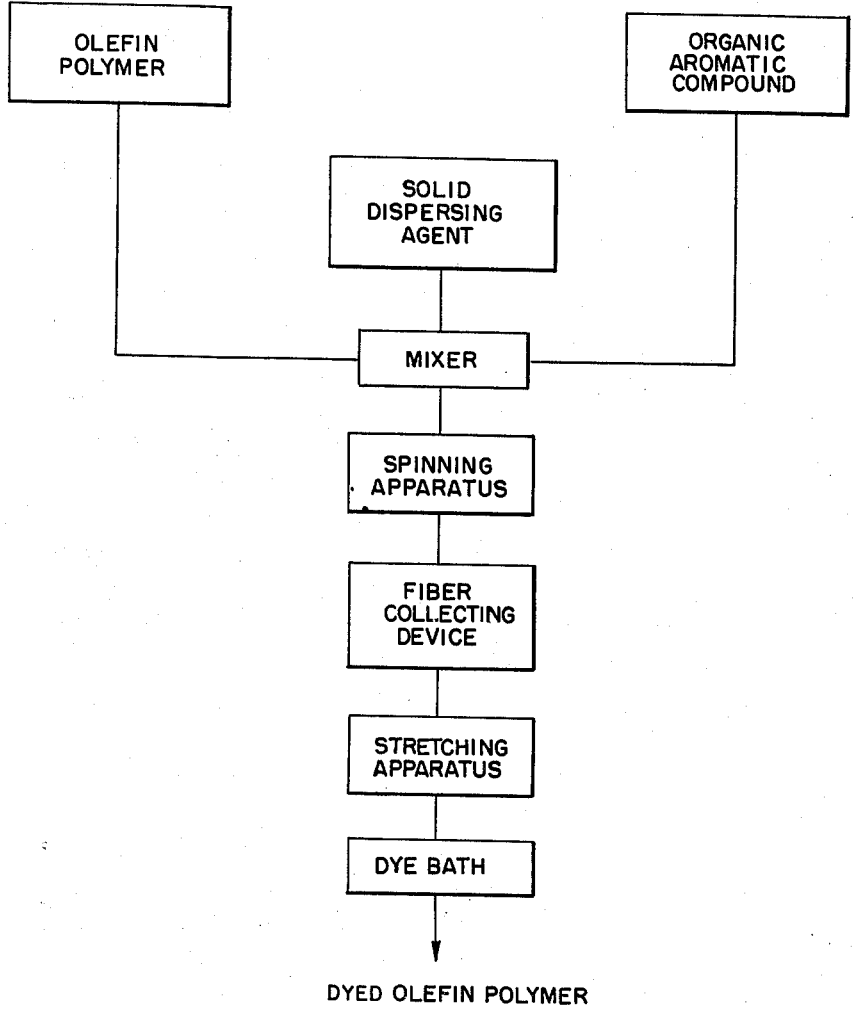

The present invention relates to crystalline polyolefin textile fibres that may be dyed by treatment with aqueous solutions of diazonium salts and to a process for preparing the same.

A number of processes have been described for the obtaining of textile fibres having particular receptivity to dyes, these fibres having been obtained from polyolefins prepared with the aid of stereospecific catalysts. Five typical such prior processes may be summarized as follows:

(1) *Preparation of fibres from mixtures.*—Polyolefins are mixed with other resins such as epoxy resins, polyamides, polyimines, polyesters and the like, which resins are capable of rendering the fibres dyeable, and the mixtures are spun according to the usual spinning techniques. If epoxy resins are used a further treatment of the fibres with basic substances may be provided for.

(2) *Grafting of reactive monomers onto the fibres.*— The polyolefin fibres are treated with reactive monomers in the presence of agents which catalyze the polymerization of the monomers. In this way the monomers are polymerized onto the fibres by means of the graft polymerization. Typical reactive monomers include vinyl monomers such as acrylonitrile, styrene, vinyl esters, and nitrogen-containing monomers such as vinylpyridines, isopropenylpyridines, etc., and acid monomers.

(3) *Mixing polyolefins with various monomers in the spinning.*—Polyolefins are added with vinyl monomers, acid monomers or the like before spinning and the mixes are then subjected to the usual technological operations for preparing textile fibres.

(4) *Chemical treatment on the fibres.*—The polyolefin fibres are subjected to sulfonation. The sulfonated fibres are then subjected to an amination treatment.

(5) *Mixing and chemical treatments.*—Polyolefins are mixed with halogenated aliphatic compounds, the mixtures are spun, and the fibres are subjected to the action of amine or imine compounds.

It is an object of this invention to provide a novel method for rendering crystalline polyolefins dye-receptive.

Another object is to provide a method of treating crystalline polyolefins whereby their affinity for diazonium dyes is markedly increased.

Another object is to provide a method of rendering crystalline polyolefins receptive to basic dyes and acetate dyes.

Additional objects will become apparent hereinafter.

We have found that dye-receptive textile fibres can be obtained by mixing crystalline polyolefins, such polyolefins having been prepared with the aid of stereospecific catalysts such as those described in Italian Patent 526,101, with from about 1 to 25% of an organic aromatic compound containing phenolic hydroxyl groups, and then extruding the mixture to form fibres. Naphthols and derivatives thereof are found to be particularly suitable. The salts of such phenolic hydroxyl compounds may also be used in the process of our invention.

The resulting fibres can be dyed by treatment with aqueous solutions of a diazonium salt. They may also be dyed with basic dyes or acetate dyes. The colors obtainable with diazonium salts are particularly resistant to washing, rubbing and light.

Typical crystalline polyolefins that may be used in the process of our invention include polyethylene, polypropylene, polybutene and the like.

Typical phenolic compounds include

O-tolylide of $\beta$-hydroxynaphthoic acid
o-Anisylide of $\beta$-hydroxynaphthoic acid
p-Anisylide of $\beta$-hydroxynaphthoic acid
m-Nitroanilide of $\beta$-hydroxynaphthoic acid
4-chloro-o-toluilide of $\beta$-hydroxynaphthoic acid
4,6-dimethoxy - 3 - chloroanilide of $\beta$-hydroxynaphthoic acid
Anilide of $\beta$-hydroxynaphthoic acid
p-Chloroanilide of $\beta$-hydroxynaphthoic acid
$\alpha$-Naphthalide of $\beta$-hydroxynaphthoic acid
$\beta$-Naphthol
$\beta$-Hydroxy naphthoic acid The spinning of the mixtures of a crystalline polyolefin with naphthols or naphtholates can be carried out in the presence of a small amount of a "solid dispersing agent," i.e., cetyl or stearyl alcohol; stearic or terephthalic acids; benzoin; furoin; vinyl stearate; glycerol mono-, di- and tri-stearic esters; monoethanolamine stearate; stearic amide; N-diethanol-lauramide; $C_6$ to $C_{30}$ aliphatic amines; condensation products of ethylene oxide with alcohols, amines and phenols; polyesteramide; polyacrylic acid; polystyrene and styrene copolymers; terpene polymers, etc.

Dyeing with diazonium salts is preferably carried out in the warm.

After the spinning of fibres they may be hot-stretched, preferably with a stretching ratio of from about 1:2 to 1:10.

Subsequent to the stretching operation, the fibres may be dyed by treatment with an aqueous solution of a diazonium salt of an aromatic amine. The aqueous solution desirably contains from about 2% to 10% of the diazonium salt.

The attached figure shows a schematic representation of a suitable procedure for treating the crystalline polyolefins. As shown in said figure, the crystalline polyolefin and the organic aromatic compound may be mixed in a suitable mixing device. If so desired, a solid dispersing agent may also be added to said mixer although the use of a dispersing agent is not required. The resulting mix is then formed into fibers in a spinning device. The fibers are collected therefrom, subjected to a stretching step and thereafter dyed.

The following examples will further illustrate our invention. All parts are by weight unless otherwise stated.

*Example 1*

A mix is prepared at room temperature in a ball mill from 90 g. of polypropylene, 9 g. O-tolylide of $\beta$-hydroxynaphthoic acid and 1 g. of the condensation product of ethylene oxide with $C_{10}$–$C_{14}$ alcohols. The polypropylene is prepared with the aid of stereospecific catalysts and has an intrinsic viscosity $[\eta]$ of 1.4 (determined in tetrahydronaphthalene at 135° C.), a residue after heptane extraction of 94%, and an ash content of 0.055%.

This mix is spun in a laboratory melt spinning apparatus under the following conditions:

Spinneret type _____ 1/0.8 x 16 mm.
Extrusion temperature _____ 210° C.
Extrusion pressure _____ 7.8 kg./cm.$^2$.
Winding speed _____ 210 m./minute.

The fibres thus obtained are stretched in a device heated with hot air with a stretching ratio of 1:4.5 at 130° C. The fibres are then dyed with intense and solid shades by treatment of 70° C. for 30 minutes with aqueous solutions containing 5% of diazonium salts of the following amines: o-nitroanilide (salt for solid orange O); 2,5-dichloroaniline (salt for solid scarlet DS); 4-chloro-2-anisidine (salt for solid red 4CA); 4,4'-diaminodiphenylamine (salt for solid black B).

The fibres also may be intensely dyed with the following dyes: Basic fuchsine (basic); Astrazon blue G (basic); Crystals malachite green (basic); Setacyl yellow 3G (acetate dye); Cibacet scarlet BR (acetate dye); Acetoquinone blue RHO (actate dye).

*Example 2*

A mix is prepared at room temperature in a ball mill from 90 g. polypropylene, 10 g. 4,6-dimethoxy-3-chloroanilide of β-hydroxynaphthoic acid. The polypropylene is prepared with stereospecific catalysts and has an intrinsic viscosity [η] of 1.4, a residue after heptane extraction of 94%, and an ash content of 0.055%.

The mix is spun in a laboratory melt spinning device under the following conditions:

Spinneret type _____ 1/0.8 x 16 mm.
Extrusion temperature _____ 205° C.
Pressure _____ 7.6 kg./cm.$^2$.
Winding speed _____ 210 m./minute.

The fibres so obtained are stretched in a device heated to 130° C. with steam with a stretching ratio of 1:8. Intense solid shades are produced by treatment at 75° C. for 30 minutes with aqueous solutions containing 7.5% diazonium salt of the following amines: o-nitroaniline (salt for solid orange O); 2,5-dichloroaniline (salt for solid scarlet DS); 4-chloro-2-anisidine (salt for solid red 4CA); 4,4'-diamino diphenylamine (salt for solid black B).

The fiber also may be intensely dyed with the following dyes: Basic fuchsine (basic); Astrazon blue G (basic); Crystals malachite green (basic); Setacyl yellow 3G (acetate dye); Cibacet scarlet BR (acetate dye); Acetoquinone blue RHO (acetate dye).

*Example 3*

A mix is prepared at room temperature in a ball mill from 90 g. polypropylene and 10 g. anilide of β-hydroxynaphthoic acid. The polypropylene is prepared with stereospecific catalysts and has an intrinsic viscosity [η] of 1.00, a residue after heptane extraction of 92.8%, and an ash content of 0.095%. The mix is spun in a melt spinning laboratory device under the following conditions:

Spinneret type _____ 1/0.8 x 16 mm.
Extrusion temperature _____ 190° C.
Pressure _____ 5.2 kg./cm.$^2$.
Winding speed _____ 210 m./minute.

The fibres thus obtained are stretched in a laboratory device with a stretching ratio of 1:5 at 130° C. Intense and solid shades are produced by treatment at 75° C. for 30 minutes with aqueous solutions containing 5% of the diazonium salts of the following amines: o-nitroaniline (salt for solid orange O); 2,5-dichloroaniline (salt for solid scarlet DS); 4-chloro-2-anisidine (salt for solid red 4CA); 4,4'-diamino diphenylamine (salt for solid black B).

The fibres also may be intensely dyed with the following dyes: Basic fuchsine (basic); Astrazon blue G (basic); Crystals malachite green (basic); Setacyl yellow 3G (acetate dye); Cibacet scarlet BR (acetate dye); Acetoquinone blue RHO (acetate dye).

*Example 4*

A mix is prepared in a ball mill at room temperature from 90 g. polypropylene and 10 g. p-chloroanilide of β-hydroxynaphthoic acid. The polypropylene is prepared with stereospecific catalysts and has an intrinsic viscosity [η] of 1.4, a residue after heptane extraction of 94% and an ash content of 0.055%.

This mix is spun in a laboratory melt spinning device under the following conditions:

Spinneret type _____ 1/0.8 x 16 mm.
Extrusion temperature _____ 210° C.
Pressure _____ 7.7 kg./cm.$^2$.
Winding speed _____ 180 m./minute.

The fibres thus obtained are stretched in a laboratory device with a ratio of 1:7 at 130° C. Intense and solid shades are obtained by treatment at 70° C. for 30 minutes with aqueous solutions containing 5% of the diazonium salt of the following amines: o-nitroaniline (salt for solid orange O); 2,5-dichloroaniline (salt for solid scarlet DS); 4-chloro-2-anisidine (salt for solid red 4CA); 4,4'-diamino diphenylamine (salt for solid black B).

The fibres also may be intensely dyed with the following dyes: Basic fuchsin (basic); Astrazon blue G (basic); Crystals malachite green (basic); Setacyl yellow 3G (acetate dye); Cibacet scarlet BR (acetate dye); Acetoquinone blue RHO (acetate dye).

*Example 5*

A mix is prepared at room temperature in a ball mill from 90 g. polyethylene (prepared with stereospecific catalysts and having a molecular weight of about 50,000) and 10 g. anilide of β-hydroxynaphthoic acid.

This mix is spun in a laboratory melt spinning device under the following conditions:

Spinneret _____ 1/0.8 x 16 mm.
Extrusion temperature _____ 190° C.
Pressure _____ 4.7 kg./cm.$^2$.
Winding speed _____ 120 m./minute.

The fibres thus obtained are stretched in a laboratory device with a ratio of 1:3 at 95° C. Intense and solid shades are produced by treatment of 50° C. for 30 minutes with aqueous solutions containing 5% of the diazonium salts of the following amines: o-nitroaniline (salt for solid orange O); 2,5-dichloroaniline (salt for solid scarlet DS); 4-chloro-2-anisidine (salt for solid red 4CA); 4,4'-diamino diphenylamine (salt for solid black B).

The fibres also may be intensely dyed with the following dyes: Basic fuchsine (basic); Astrazon blue G (basic); Crystals malachite green (basic); Setacyl yellow 3G (acetate dye); Cibacet scarlet BR (acetate dye); Acetoquinone blue RHO (acetate dye).

Variations can, of course be made without departing from the spirit of our invention.

Having thus described our invention, what we desire to secure and claim by Letters Patent is:

1. A method of rendering polyolefins dye-receptive which comprises melt-mixing with said polyolefin about 1–25%, based on the weight of said mixture of an organic compound selected from the group consisting of β-naphthol, β-hydroxynaphthoic acid, N-substituted amides of β-hydroxynaphthoic acid, and salts thereof and extruding said mixture in fibre form.

2. The method of claim 1, wherein said polyolefin is selected from the group consisting of polyethylene, polypropylene, polybutene, and mixtures thereof, said polyolefin having been prepared with stereospecific catalysts.

3. The method of claim 1, wherein the organic compound is the o-tolylide of β-hydroxynaphthoic acid.

4. The method of claim 1, wherein the organic compound is the 4,6-dimethoxy-3-chloroanilide of β-hydroxynaphthoic acid.

5. The method of claim 1, wherein the organic compound is the anilide of β-hydroxynaphthoic acid.

6. The method of claim 1 wherein the organic compound is the p-chloroanilide of β-hydroxynaphthoic acid.

7. The method of claim 1 wherein in addition to the organic compound, there is added a small proportion of a solid dispersant for the organic compound in the molten mass.

8. The method of claim 1 wherein the fibres, after spinning, are stretched with a stretching ratio of from 1:2 to 1/10, at a temperature of from 80° to 150° C., in a hot stretching device.

9. The method of claim 1, wherein the resulting fibres are dyed by treatment with an aqueous solution containing 2 to 10% of a diazonium salt of an aromatic amine.

10. The method of claim 1, wherein the resulting fibres are dyed by treatment with basic dyes.

11. The method of claim 1 wherein the resulting fibres are dyed by treatment with acetate dyes.

References Cited by the Examiner

UNITED STATES PATENTS

| | | | |
|---|---|---|---|
| 2,868,774 | 1/59 | Straley et al. | |
| 2,882,176 | 4/59 | Straley et al. | 106—194 |
| 3,011,860 | 12/61 | Hirshfeld et al. | 18—54 |

FOREIGN PATENTS

| | | |
|---|---|---|
| 822,230 | 10/59 | Great Britain. |
| 479,317 | 12/51 | Canada. |

OTHER REFERENCES

Speel et al.: "Textile Chemicals and Auxiliaries," Reinhold Publishing Corp., New York, 2nd ed. (1957), pp. 65–66.

ALEXANDER H. BRODMERKEL, *Primary Examiner.*

WILLIAM J. STEPHENSON, MICHAEL V. BRINDISI, MORRIS LIEBMAN, *Examiners.*